US011964389B2

(12) United States Patent
Johansen

(10) Patent No.: US 11,964,389 B2
(45) Date of Patent: Apr. 23, 2024

(54) STRAIN WAVE GEAR WITH OUTPUT FLANGE AND INTEGRATED ENCODER

(71) Applicant: Universal Robots A/S, Odense (DK)

(72) Inventor: Steffen Henrik Johansen, Odense (DK)

(73) Assignee: UNIVERSAL ROBOTS A/S, Odense S (DK)

(*) Notice: Subject to any disclaimer, the term of this patent is extended or adjusted under 35 U.S.C. 154(b) by 0 days.

(21) Appl. No.: 16/759,461

(22) PCT Filed: Nov. 15, 2018

(86) PCT No.: PCT/EP2018/081413
§ 371 (c)(1),
(2) Date: Apr. 27, 2020

(87) PCT Pub. No.: WO2019/096923
PCT Pub. Date: May 23, 2019

(65) Prior Publication Data
US 2020/0340569 A1 Oct. 29, 2020

(30) Foreign Application Priority Data
Nov. 15, 2017 (EP) ..................... 17201940

(51) Int. Cl.
B25J 9/10 (2006.01)
B25J 17/00 (2006.01)
(Continued)

(52) U.S. Cl.
CPC ............. B25J 9/1025 (2013.01); B25J 17/00 (2013.01); F16H 49/001 (2013.01); G01D 5/142 (2013.01); G01D 5/26 (2013.01)

(58) Field of Classification Search
CPC .............. F16H 49/001; F16H 2049/003; B25J 9/1025; B25J 17/00; G01D 5/142; G01D 5/26
See application file for complete search history.

(56) References Cited

U.S. PATENT DOCUMENTS 5,178,031 A * 1/1993 Orsi .................... B25J 9/1025
901/14
5,448,944 A 9/1995 Line et al.
(Continued)

FOREIGN PATENT DOCUMENTS

CN 101371105 A 2/2009
CN 103987994 A 8/2014
(Continued)

OTHER PUBLICATIONS

JP S61177243 U (Hiroshi Baniwa) Nov. 5, 1986 (full text) [online] [retrieved on Aug. 8, 2023]. Retrieved from: Clarivate Analytics. (Year: 1986).*

(Continued)

Primary Examiner — Joseph Brown
(74) Attorney, Agent, or Firm — Burns & Levinson LLP

(57) ABSTRACT

A strain wave gear comprising an outer ring and an inner ring rotatably arranged in the outer ring. The inner ring comprises an internally toothed gear and a flex spline is arranged in the inner ring and comprise a flexible part comprising an external toothed gear. A wave generator is rotatable in relation to the flex spline and is configured to flex the flexible part in a radial direction to partly mesh the external toothed gear with the internally toothed gear causing rotation of the inner ring in relation to the outer ring. A part of said inner ring extends out of said outer ring and comprises an outwardly protruding output flange. An encoder reader can be disposed on the outer ring and an encoder track can disposed on the inner ring. A robot joint comprising the strain wave gear is also disclosed.

22 Claims, 10 Drawing Sheets

(51) Int. Cl.
*F16H 49/00* (2006.01)
*G01D 5/14* (2006.01)
*G01D 5/26* (2006.01)

(56) References Cited

U.S. PATENT DOCUMENTS

| | | | |
|---|---|---|---|
| 5,775,178 | A | 7/1998 | Asawa et al. |
| 5,906,142 | A | 5/1999 | Shirasawa |
| 6,530,457 | B1 | 3/2003 | Nago et al. |
| 8,991,282 | B2 | 3/2015 | Yajima et al. |
| 2005/0235774 | A1* | 10/2005 | Tanioka ............... F16H 49/001 74/640 |
| 2007/0110554 | A1* | 5/2007 | Ono ..................... B25J 9/1025 414/744.5 |
| 2008/0315728 | A1 | 12/2008 | Liu et al. |
| 2014/0157925 | A1 | 6/2014 | Yajima et al. |
| 2016/0305527 | A1 | 10/2016 | Chuo et al. |
| 2017/0051817 | A1* | 2/2017 | Maruyama ........... F16H 49/001 |
| 2017/0222517 | A1* | 8/2017 | Kobayashi ............ H02K 7/102 |
| 2017/0237315 | A1* | 8/2017 | Hirokawa ............. H02K 41/06 310/77 |
| 2017/0338718 | A1* | 11/2017 | Terashima ........... F16H 49/001 |
| 2020/0298423 | A1 | 9/2020 | Ayuzawa |
| 2020/0340569 | A1 | 10/2020 | Johansen |
| 2021/0041846 | A1 | 2/2021 | Horiguchi |
| 2022/0307581 | A1 | 9/2022 | Johansen et al. |

FOREIGN PATENT DOCUMENTS

| | | | |
|---|---|---|---|
| EP | 0112891 | A1 | 7/1984 |
| JP | S61177243 | U * | 11/1986 |
| JP | 2009050641 | A | 3/2009 |
| KR | 20170053499 | A | 5/2017 |
| WO | 2007082954 | A1 | 7/2007 |
| WO | 2012042562 | A1 | 4/2012 |
| WO | 2014091522 | A1 | 6/2014 |
| WO | 2016049622 | A1 | 3/2016 |
| WO | 2017012626 | A1 | 1/2017 |
| WO | 2017148499 | A1 | 9/2017 |
| WO | 2017203753 | A1 | 11/2017 |
| WO | 2018130447 | A1 | 7/2018 |
| WO | 2018157910 | A1 | 9/2018 |
| WO | 2019096923 | A2 | 5/2019 |
| WO | 2019219886 | A1 | 11/2019 |

OTHER PUBLICATIONS

International Search Report for international Patent Application No. PCT/EP2018/081413, dated May 23, 2019. (6 pages).
Written Opinion for International Patent Application No. PCT/EP2018/081413, dated May 23, 2019. (12 pages).
International Preliminary Report on Patentability for International Patent Application No. PCT/EP2018/081413, dated May 19, 2019. (13 pages).
Notice of Grounds for Rejection for Korean Patent Application No. 10-2020-7012475, dated Nov. 18, 2021, (9 pages), (with English translation).
Communication pursuant to Article 94(3) EPC for European Patent Application No. 18812073.7, dated Feb. 7, 2022. (7 pages).
Decision of Final Rejection for Korean Patent Application No. 10-2020-7012475, dated Jun. 21, 2022, (with English translation) (6 pages).
Notice of Reasons for Rejection for Japanese Patent Application No. 2020-526139, dated Nov. 1, 2022, (with English translation) (9 pages).
First Office Action for Chinese Patent Application No. 201880071930.2, issued Feb. 7, 2023, (with English summary) 16 pages.
Extended European Search Report for European Patent Application No. 21216445.3, issued May 13, 2022, 12 pages.
International Search Report for International Patent Application No. PCT/EP2019/062750, issued Jan. 24, 2020, 6 pages.
Written Opinion for International Patent Application No. PCT/EP2019/062750, issued Jan. 24, 2020, 9 pages.
Decision of Rejection for Japanese Patent Application No. 2020-526139, issued May 16, 2023, (with English summary), 4 pages.
Intention to Grant for Danish Patent Application No. PA 202170142, mailed Sep. 13, 2021, 11 pages.
Second Office Action in Chinese Application No. 201880071930.2 dated Oct. 20, 2023, with English summary, 17 pages.

* cited by examiner

STRAIN WAVE GEAR WITH OUTPUT FLANGE AND INTEGRATED ENCODER

This application is a U.S. national stage entry of PCT application no. PCT/EP2018/081413 which was filed on Nov. 15, 2018. PCT application no. PCT/EP2018/081413 claims priority to European application no. 17201940.8 which was filed on Nov. 15, 2017. This application claims priority to both PCT application no. PCT/EP2018/081413 and to European application no. 17201940.8. Both PCT application no. PCT/EP2018/081413 and European application no. 17201940.8 are incorporated into this this application by reference.

FIELD OF THE INVENTION

The present invention relates to a strain wave gear for a robot joint. The strain wave gear comprises an outer ring and an inner ring rotatably arranged in the outer ring, where the inner ring comprises an internally toothed gear and a flex spline is arranged in the inner ring and comprise a flexible part comprising an external toothed gear. A wave generator is configured to flex the flexible part in a radial direction to partly mesh the external toothed gear with the internally toothed gear causing rotation of the inner ring in relation to the outer ring. The strain wave gear can be made cost effective, has fewer parts, easier to assemble, compact and small and has a high rigidity. Moreover, the invention relates to a strain wave gear with an encoder placed inside the gear to read the gear's output position. The present invention also relates to a robot joint where a robot motor is configured to rotate an output flange via such strain wave gear.

BACKGROUND OF THE INVENTION

In the field of robotics, where a robot arm comprises a number of robot joints connecting different parts of the robot arm and where a joint motor is configured to move the parts in relation to each other, it is known to use strain wave gears as a transmission system between the joint motor and the movable part, as the strain wave gears transmits large forces without backlash.

The prior art discloses wave gear drives with flexible external gears. Typically, such a flexible external gear comprises a flex spline, a circular diaphragm extending outward or inward in a radial direction from one open end of the body (often referred to as silk hat or cup type), a circular boss formed integrally on a circumferential outer peripheral edge of the diaphragm, and external teeth formed on a circumferential outer surface of the other open end portion of the body. Sometimes strain wave gears are designed with the flexible gear part as a cylindrical ring with external teeth (this type often referred to as ring type gears).

Strain wave gears are used in a variety of applications such as CNC-machines, robotics, satellites, solar tracking, etc. They are very precise with little or no backlash, and therefore often preferred in applications where high precision and accuracy of the output is needed. In these applications a feedback system is often used such as an electronic encoder connected to control electronics that run an electric motor driving the input side of the strain wave gear.

This setup renders it possible to control the output of the gear with high precision and accuracy. Normally a reading track for the encoder is placed somewhere on the output part of the strain wave gear being on a flat end surface or on the outside diameter of an output axle. The encoder read head is normally placed on some external gear geometry or in a housing/cabinet holding the strain wave gear. This approach normally requires adjustment to have the encoder read head positioned properly with respect to the read track. The encoder technology can be magnetic, optical, inductive or other. Another often used approach is to make a platform/bearing setup for the encoder with a flexible mechanism/axle from the strain wave gears output side to the reading track of the encoder. In this way the positioning of the encoder read head against the encoder read track can be controlled by a separate bearing held in place by a platform. This approach requires many extra parts which adds cost, requires space and has the potential to fail if quality or tolerances on the parts gets out of control.

The strain wave gears are normally built and assembled from a number of separate parts. That is the output bearing part is put together with a separate circular spline part and again with a separate output flange part. This approach makes it possible to adapt the parts to different applications by combining different output bearings and different output flanges with the circular spline. Sometimes it has been seen that the output bearing part has been machined as a combined part with the circular spline part. The downside of using separate components is that the assembly of these separate components requires high accuracy in the parts interfaces and a high number of strong screws to support the usually heavy loads on the strain wave gear assemblies.

U.S. Pat. No. 5,906,142 discloses a wave gear drive having first and second end plates arranged to rotate relative with each other by means of a cross roller bearing positioned between the plates. An inner race of the cross roller bearing is formed integrally on a circumferential Inner surface with an internal gear. The inner race is directly fastened to the first end plate, while an outer race of the cross roller bearing is fastened to the second end plate in a manner such that a circular boss of a flexible external gear is held between the outer race and the second end plate. The internal teeth are positioned approximately at a radially inner side of a raceway of the cross roller bearing. Thus, the wave gear drive (1) is small and compact, and the rigidity is increased.

U.S. Pat. No. 5,775,178 discloses a wave gear device has a circular spline, a flexspline arranged within the circular spline, and a wave generator disposed within the flexspline for deflecting the flexspline in radial direction for partially engaging external tooth formed on the flexspline with internal gear teeth formed on the circular spline and shifting an engaging position in circumferential direction to cause relative rotation depending upon difference in number of teeth of the internal gear teeth and the external gear teeth between the circular spline and the flexspline. The circular spline has an annular rigid teeth portion formed with the internal gear teeth along the inner periphery thereof, a fastening portion to be rigidly secured on one of a device housing and a supporting member rotatably supported in the device housing, and a connecting portion connecting the rigid teeth portion and the fastening portion. The connecting portion has a low rigidity at least in one of a direction of an axis of the device and a direction perpendicular to the axis, in comparison with that of the rigid teeth portion.

U.S. Pat. No. 8,991,282 discloses a wave gear unit having an input shaft positioned along a center axis by first and second input bearings. A first unit end plate at the first-input-bearing side is a composite member in which a bearing housing member of an iron-based material is integrated with an end plate main body member of a lightweight material. A second unit end plate at the second-input-bearing side is integrated with a rigid internally toothed gear, and is a composite member in which a second member of a lightweight material is integrated with a first member of a lightweight material. The first member has an end plate main body portion of the second unit end plate and a gear main body portion of the rigid internally toothed gear, while the second member has a bearing housing portion of the second unit end plate and a teeth formation portion of the rigid internally toothed gear.

SUMMARY OF THE INVENTION

The object of the present invention is to address the above described limitations with the prior art or other problems of prior art strain wave gears used for robot arms, for instance by providing a strain wave gear that is more cost effective, can be built with fewer parts and can cope with higher loads on the output and has with enhanced rigidity. Also, it is an object of the present invention to provide a strain wave gear having a more precise encoder than in prior art solutions and which does not require manual adjustment to the distance between read head and read track in radial or axial direction. This is achieved by a strain wave gear as defined by the independent claims. The dependent claims describe possible embodiments of the strain wave gear. The advantages and benefits of the present invention are described in the detailed description of the invention.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
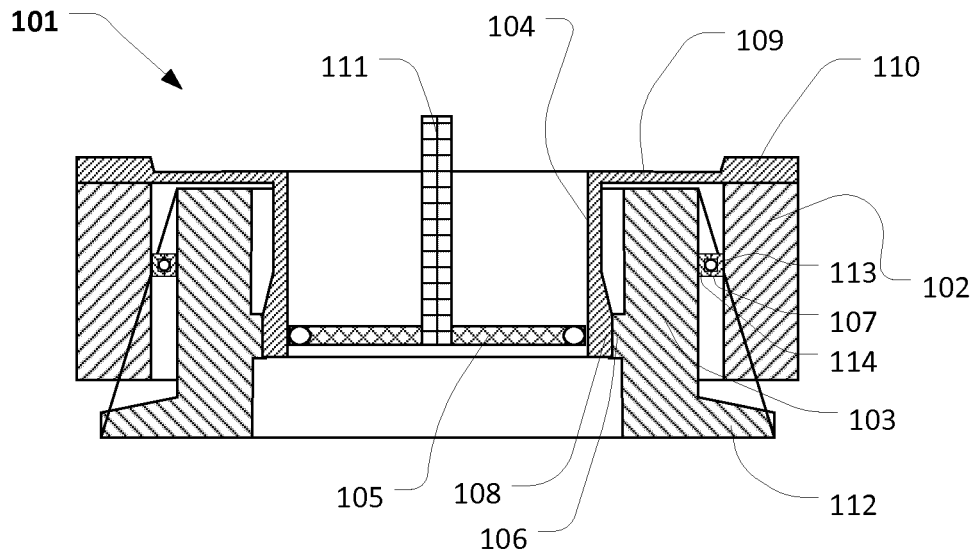
FIG. 1 illustrates a simplified cross-sectional view of an embodiment of a strain wave gear according to a first aspect of the present invention.

FIG. 1 illustrates a simplified cross-sectional view of a strain wave gear 101 according to a first aspect of the present invention. The strain wave gear comprises an outer ring 102, an inner ring 103, a flex spline 104 and a wave generator 105.

The outer ring 102 is formed as an annular shaped body and the inner ring 103 is rotatable arranged in the central opening of the outer ring. In the illustrated embodiment the outer ring is provided as a cylinder, however it is noticed that the outer ring does not need to be formed as a geometrical cylinder or annulus, if the inner ring 103 can be rotatable arrange in the central opening of the outer ring. Consequently, the outer ring may have many different forms. The outer ring serves as the housing of the strain wave gear and can for instance be used to secure the strain wave gear in relation to a motor or inside a robot joint.

The inner ring 103 is formed as an annular shaped body and the flex spline 104 is arranged in the central opening of the inner ring. In the illustrated embodiment the part of the inner ring, which is arranged in the outer ring, is formed as a cylinder. However, it is noticed that the inner ring does not need to be formed as a geometrical cylinder or annulus, if the inner ring 103 can be rotatable arrange in the central opening of the outer ring. Consequently, the inner ring may have many different forms. The inner ring 103 comprises also an internally toothed gear 106 arrange at the inner wall of the inner ring and facing the central opening of the inner ring. In the illustrated embodiment the inner ring is rotatable arranged in the outer ring via an internal bearing 107.

The internal bearing is illustrated as a ball bearing comprising an outer racer 113 arranged in the outer ring 102 and an inner racer 114 wherein the inner ring 103 is arranged. However, it is to be understood that any kind of bearing can be used, for instance ball bearings, cross roller bearings, needle bearings, sliding bearings etc. or any other mechanism allowing the inner ring to rotate in relation to the outer ring. It is also noted the more than one internal bearing may be provided.

The flex spline 104 is formed as a flexible cylindrical body, arranged in the inner ring and comprises an external toothed gear 108. The external toothed gear is configured to at least partially intermesh with the internal toothed gear 106. The flex spline comprises an annular diaphragm 109 formed integrally with the cylindrical body and extending outwardly in relation to the cylindrical body. The annular diaphragm 109 comprises and annular boss 110 formed integrally on a circumferential outer peripheral edge of the diaphragm. The annular boss 110 is fixed to the outer ring 102 using any kind of fasteners such as screws, rivets, nails, click/snap mechanisms, adhesive, welding or any other kind of means for fastening the annular boss to the outer ring. Consequently, the inner ring is arranged between the outer ring 102 and the cylindrical body of the flex spline 104. The external gear teeth 108 are formed at the other end of the cylindrical body and extend along the outer peripheral surface.

The wave generator 105 is rotatably arranged in the flex spline 104 and rotatable by an input shaft 111. The input shaft is configured to rotate the wave generator in relation to the flex spline and the wave generator is upon rotation configured to flex the flexible cylindrical body in a radial direction to partly mesh the external toothed gear 108 with the internally toothed gear 106. The wave generator can for instance be provided as an elliptical rigid cam, as a elliptical wave bearing or any other mechanism configured to flex parts of the cylindrical body in a radial direction. The number of teeth of the internal toothed gear and the external toothed gear are different and rotation of the wave generator moves meshing positions of the gears in a circumferential direction causing the inner ring to rotate in relation to the outer ring. The input shaft can for instance be driven by a motor whereby the strain wave gear forms a transmission system between the motor and output side of the strain wave gear.

A part of the inner ring extends out of said outer ring and comprises an outwardly protruding output flange 112. The outwardly protruding output flange extends outwardly in relation to the inner ring and towards the outer ring. Providing the inner ring with an outwardly protruding output flange makes it possible to connect the strain wave gear directly to the object to be driven by the strain wave gear. This is beneficial in the field of robotics where strain wave gears often are used to drive parts of a robot arm; thus, the strain wave gear according to the first aspect of the present invention can be connected directly with a robot link or a robot joint. The outwardly protruding output flange makes it possible to increase the diameter of the contact surface whereby a better and more reliable and stable contact can be obtained between the strain wave gear and the object to be driven by the strain wave gear. Further the outwardly protruding output flange can be provided with mechanical elements ensuring a better connection between the strain wave gear and the connected object, such as connecting teeth, connecting flanges, indicating elements (e.g. matching surface structures) ensuring correct orientation of the connected object in relation to the strain wave gear. For instance, in one embodiment the outwardly protruding output flange can be provided as one of the component flanges of the releasable joint assembly disclosed by WO 2018/130447 incorporated herein by reference.

The geometry/shape of the outwardly protruding output flange can be very precisely centered with respect to the gear axis as it is integrated with the inner ring comprising the internally toothed gear, and there are thus no assembly tolerances from separate parts being screwed together. The gear will be easier and quicker to assemble because no screws are needed to assemble the separate parts. The quality and reliability of the gears will be higher because there is no risk of screws breaking or becoming loose and there is no risk of flanges slipping if screws are not tightened correctly. Further, a more rigid strain wave gear is hereby provided as the rotating toothed gear of the inner ring and outwardly protruding output flange can be provided as one single body which ensures a more direct transfer of torque from the toothed gear to the output flange. Consequently, more rigid connection can be established between different part of a robot arm.

Furthermore, the weight of the strain wave gear will be lower because the integration of parts can be optimized for strength, where the separate parts need excessive material to form support geometry and centering rims, and because no screws are needed. The cost of the strain wave gear will be lower because of fewer parts to be fabricated and less material used. The strain wave gear will be able to drive higher loads on the outwardly protruding output flange as the outwardly protruding output flange can be provided as an integral part of the inner ring. The strain wave gear according to the first aspect of the invention thus provide a strain wave gear that is more cost effective, can be built with fewer parts and can cope with higher loads on the output and has enhanced rigidity.

Figure 2:
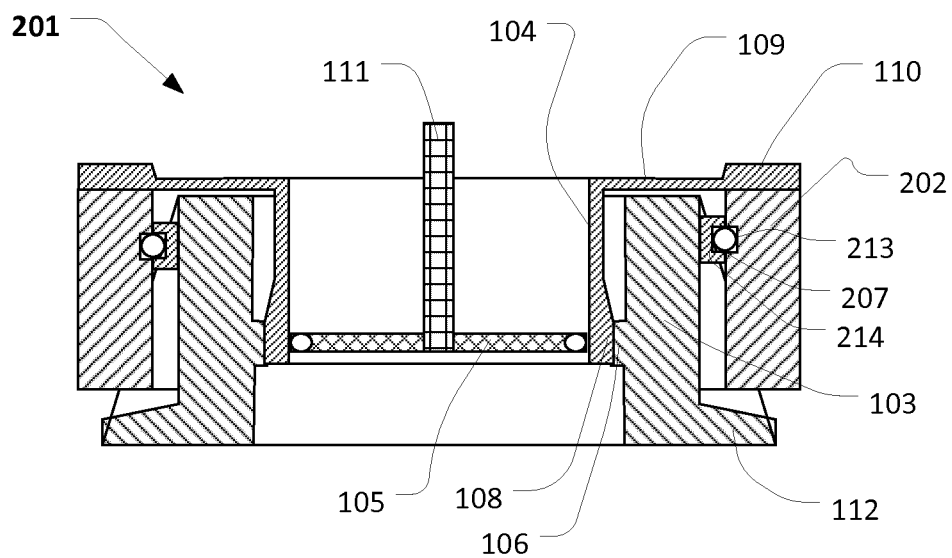
FIGS. 2-6 illustrate simplified cross-sectional views of various embodiments of a strain wave gear according to the first aspect of the present invention.

FIG. 2 illustrates a simplified cross-sectional view of another embodiment of a strain wave gear 201 according to a first aspect of the present invention. The strain wave gear 201 is like the strain wave gear 101 illustrated in FIG. 1 and similar elements have been given the same reference numbers as in FIG. 1 and will not be described further. In this embodiment at least a part of the outer racer 213 of the internal bearing 207 is integrally formed in the outer ring 202 and the inner racer 214 of the internal bearing is provided as a separate part wherein the inner ring 103 is arranged. The outer racer can for instance be provided as a recess in the outer ring where the recess is configured to guide the rotational elements of the internal bearing. This makes it possible to arrange the inner ring and outer ring closer to each other whereby a more compact strain wave gear can be provided.

Figure 3:
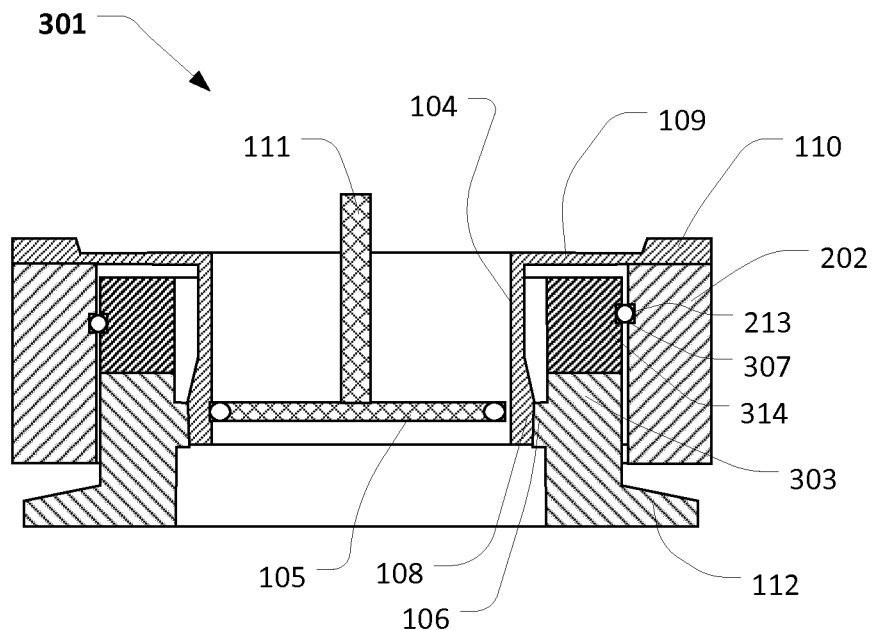

FIG. 3 illustrates a simplified cross-sectional view of another embodiment of a strain wave gear 301 according to a first aspect of the present invention. The strain wave gear 301 is like the strain wave gears 101 and 201 illustrated in FIGS. 1-2 and similar elements have been given the same reference numbers and will not be further described. In this embodiment the inner racer 314 of the internal bearing 307 is provided as a separate part and one end of the inner ring 303 is coaxially connected to the inner racer. The inner ring 303 and inner racer 314 are thus consecutively arrange along the axis of rotation of the inner ring. The inner ring 303 and the inner racer 314 can be connected using any kind of fasteners such as screws, rivets, nails, click/snap mechanisms, adhesive, welding, press fit or any other kind of means for fixing the inner ring 303 and the inner racer 314 in relation to each other. This makes it possible to provide the inner ring and the inner racer seaming as one body/part where the inner racer and the inner ring can be made of different materials. This makes it possible to reduce the radial dimensions of the inner ring and the inner racer as the outer surface of the inner ring and the inner racer can be aligned. Consequently, the inner ring and outer ring can be arranged very close to each other whereby a more compact strain wave gear can be provided. In this embodiment the internally toothed gear 106 and the outwardly protruding flange 112 of the inner ring 303 is fabricated as a single part. This leads to the fact that the output side of the strain wave gear is more rigid as the toothed gear and outwardly protruding output flange is provided as a single body. The forces causing the rotation of the inner ring is applied by the flex spline directly to the internally toothed gear of the inner ring can thus be directly transferred to the outwardly protruding output flange.

Figure 4:
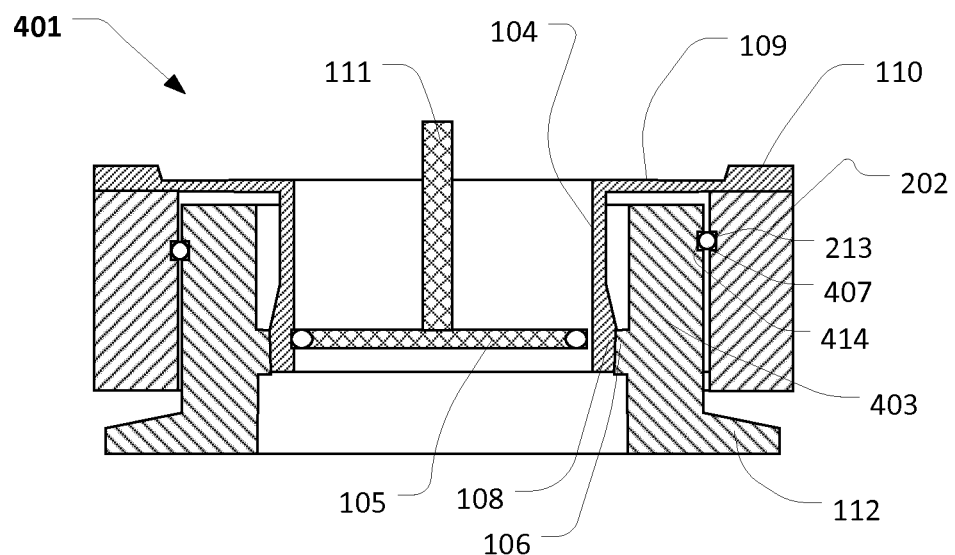

FIG. 4 illustrates a simplified cross-sectional view of another embodiment of a strain wave gear 401 according to a first aspect of the present invention. The strain wave gear 401 is like the strain wave gears 101 and 201 illustrated in FIGS. 1-2 and similar elements have been given the same reference numbers and will not be further described. In this embodiment at least, a part of the outer racer 213 of the internal bearing 407 is integrally formed in the outer ring 202 and the inner racer 414 of the internal bearing is integrally formed in the inner ring 403. This makes it possible to arrange the inner ring and outer ring very close to each other whereby a more compact strain wave gear can be provided. Further this makes it possible to reduce the number of elements that need to be assembled as the outer racer 213 and the inner racer 414 of the internal bearing 407 respectively are provided as integral parts of the outer ring 202 and inner ring 403. In other words, the outer ring forms the outer racer of an internal bearing of a strain wave gear and the inner ring forms the inner racer of an internal bearing of a strain wave gear. The inner racer of the internal bearing, the internally toothed gear and the outwardly protruding output flange are thus fabricated as a single part.

Figure 5:
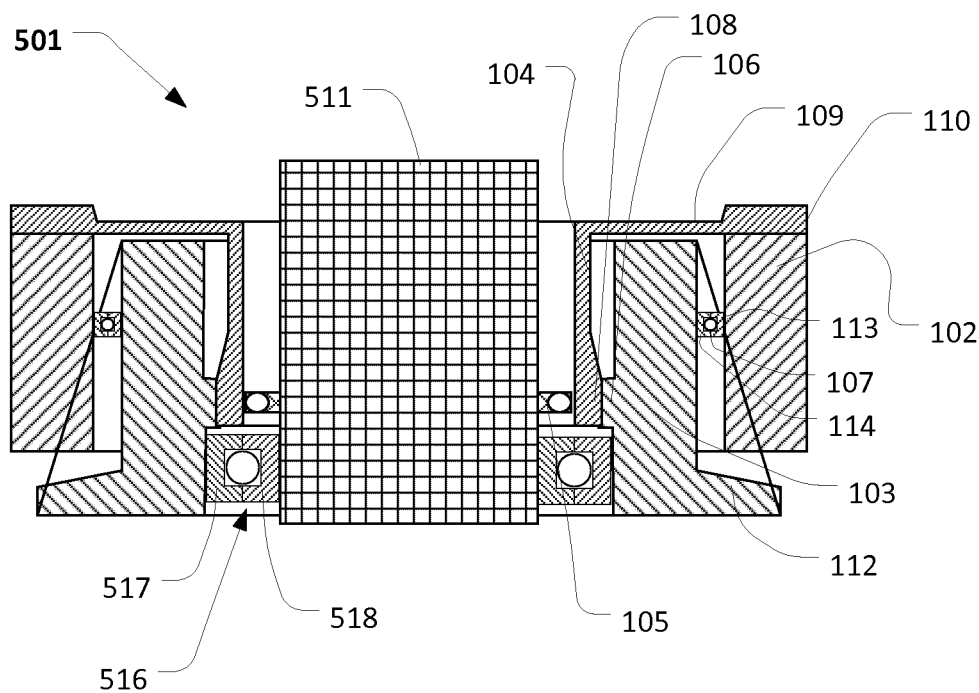

FIG. 5 illustrates a simplified cross-sectional view of another embodiment of a strain wave gear 501 according to the first aspect of the present invention. The strain wave gear 501 is like the strain wave gear 101 illustrated in FIG. 1 and similar elements have been given the same reference numbers as in FIG. 1 and will not be described further. In this embodiment the input shaft 511 extends through the flex spline 104 and is rotatable supported by the inner ring 103 via at least one input shaft support bearing 516. The input shaft support bearing 516 comprises an outer racer 517 arranged in the inner ring 103 and inner racer 518 wherein the input shaft 511 is arranged. The input shaft 511 is illustrated as a solid input shaft, however it is to be understood that the input shaft also can be provided as a hollow input shaft for instance to reduce the weight of the strain wave gear or to allow wires to be lead through the strain wave gear.

Figure 6:
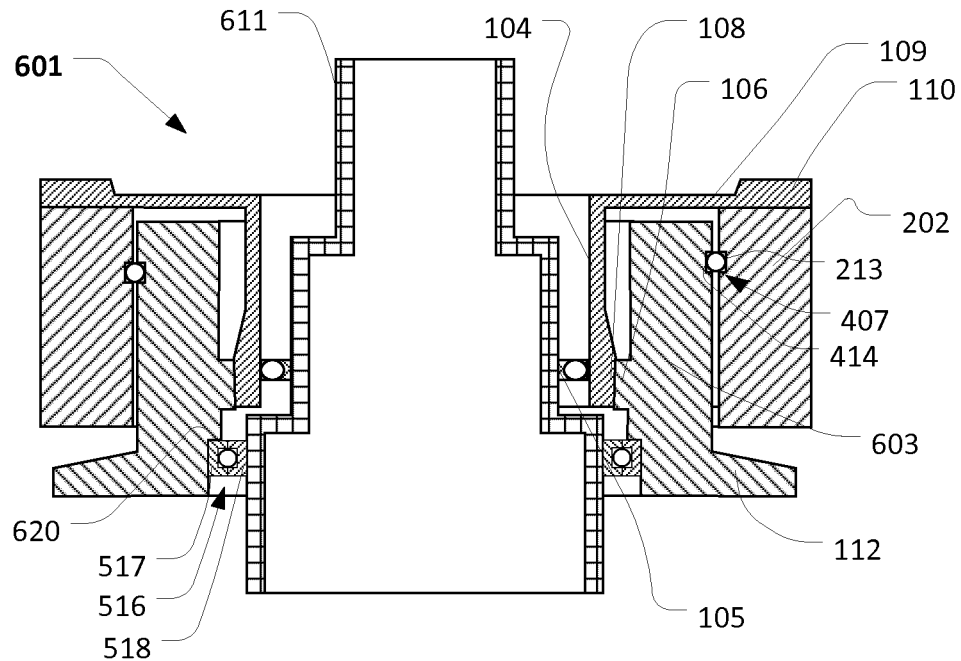

FIG. 6 illustrates a simplified cross-sectional view of another embodiment of a strain wave gear 601 according to the first aspect of the present invention. The strain wave gear 601 is like the strain wave gears illustrated in FIGS. 1-5 and similar elements have been given the same reference numbers and will not be further described. The input shaft 611 is provided as a hollow input shaft and the inner ring 603 comprise an inner annular flange 620 configured to support the input shaft support bearing 516. This ensures that the input shaft 611 is arranged at the correct positions inside the strain wave gear. Further the inner annular flange assists during assembly of the strain wave gear as it can be used as a guide to ensure correct placement of the input shaft support bearing. Similar it is noted that the input shaft 611 can comprise an outer annular flange (not shown) configured to support the input shaft support bearing 516.

It is noted that the various embodiments of the internal bearing 107, 207, 307, 407 illustrated and described in connection with FIGS. 1-4 also can be combined with the embodiments comprising a support bearing supporting the input shaft as illustrated in FIGS. 5-6.

Figure 7:
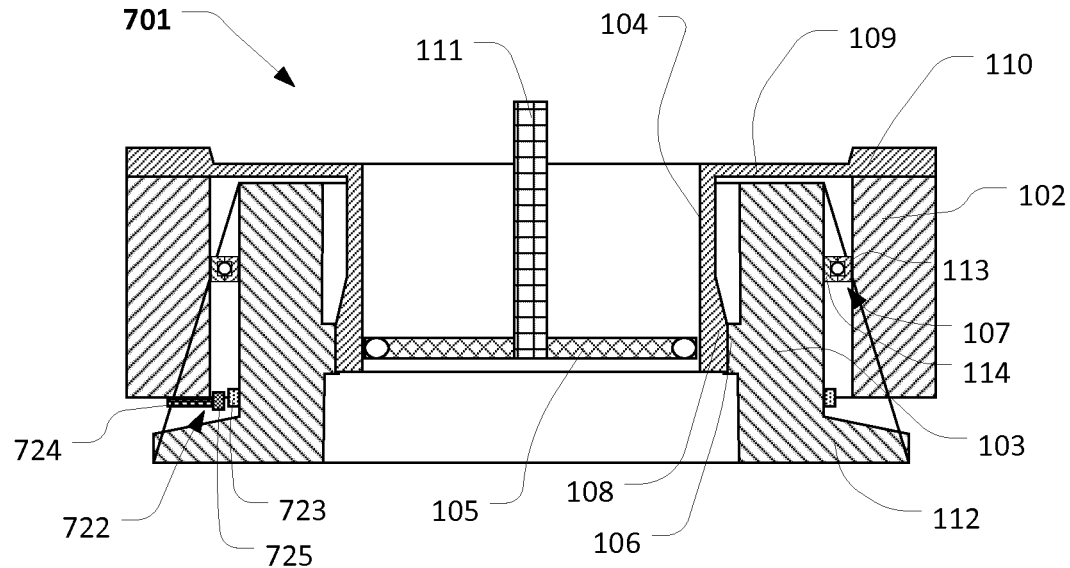
FIG. 7 illustrates a simplified cross-sectional view of an embodiment of a strain wave gear according to a second aspect the of present invention.

FIG. 7 illustrates a simplified cross-sectional view of a strain wave gear 701 according to a second aspect of the present invention. The strain wave gear 701 is like the strain wave gear 101 illustrated in FIG. 1 and similar elements have been given the same reference numbers as in FIG. 1 and will not be described further. In this embodiment an encoder reader 722 is disposed on the outer ring 102 and an encoder track 723 is disposed on the inner ring 103. This makes use of the already very precise inner ring 103 and outer ring 102 of the strain wave gear to position the encoder parts. By placing the encoder reader 722 on the fixed outer ring 102 and placing the encoder track 723 on the rotating inner ring 103, there is no need for extra parts, and the tolerance chain between the encoder reader and encoder track is the shortest possible. E.g. magnetic encoders are relying on short reading distance to deliver high accuracy and precision, and this will be possible with this invention without the need for additional manual adjustment after assembly.

The encoder reader 722 and the encoder track 723 can be mounted directly on the inner ring and outer ring parts without need for special platforms/brackets or other support parts. This saves weight and cost. The reading distance between the encoder reader and the encoder track will be very precise without the need for manual adjustment. This is an advantage because of easier assembly and lower cost. The precision and accuracy of the encoder readout can be higher than in other designs because of the precisely controlled reading distance between encoder parts. This is a big advantage in many applications, such as robotics, where precision and accuracy are needed. There is no need for mechanical transmission parts to drive the encoder track relatively to the output from the gear, which would result in lower precision and accuracy plus added cost and quality issues. The encoder parts are mechanically well protected by sitting inside the gear. This is an advantage in applications with harsh environments that could damage the delicate electronics. The encoder track 723 can be of large diameter which raises precision and accuracy.

The encoder reader comprises an encoder PCB (printed circuit board) 724 comprising electronics for controlling and reading signals to and from and encoder head 725. The encoder track 723 comprises a plurality of indicators which can be read by the encoder head whereby the encoder reader can obtain to position of the inner ring in relation to the outer ring. For instance, the encoder head may be a magnetic head (such as hall sensors) capable reading a magnetic encoder track, an optical sensor capable of reading an optical track. In the illustrated embodiment the encoder PCB 724 is arranged at the end of the outer ring opposite the end where the annular boss 110 is fixed to the outer ring 102. The encoder head 725 is arranged on the encoder PCB and faces the outer surface of the inner ring. The encoder tracks 723 is arrange at the outer surface of the inner ring at a position facing the encoder head 725.

Figure 8:
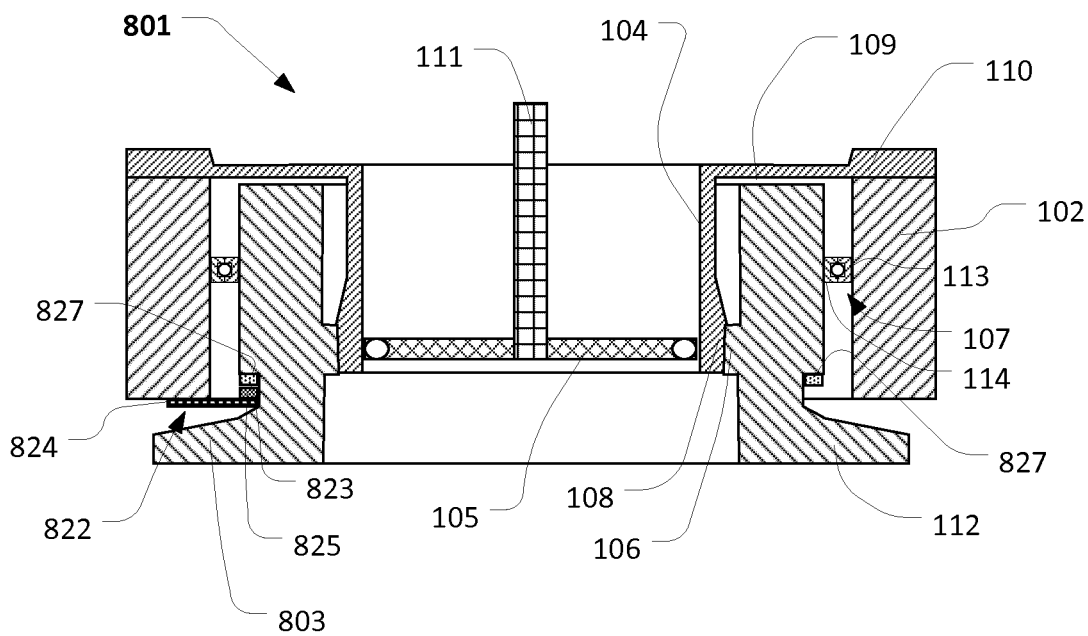
FIGS. 8-10 illustrate simplified cross-sectional views of various embodiments of a strain wave gear according to the second aspect of the present invention.

FIG. 8 illustrates a simplified cross-sectional view of another embodiment of a strain wave gear 801 according to the second aspect of the present invention. The strain wave gear 801 is like the strain wave gear 701 illustrated in FIG. 7 and similar elements have been given the same reference numbers as in FIG. 1 and will not be described further. The encoder reader 822, the encoder PCB 824, the encoder head 825, the encoder track 823 functions like the encoder reader 722, the encoder PCB 724, the encoder head 725, the encoder track 723 describe previously and their functionality will not be described further.

In this embodiment the encoder PCB 824 is arranged at the end of the outer ring 102 opposite the end where the annular boss 110 is fixed to the outer ring 102. The encoder track 824 is provided as an annulus and is arrange on an outer annular flange 827 of the inner ring 802. The outer annular flange 827 of the inner ring comprises a surface facing away from the end of the strain wave gear where the annular boss 110 is attached to the outer ring 802. The encoder head 825 is arranged on the encoder PCB 824 and faces the surface facing of the outer annular flange facing away from the end of the strain wave gear the annular boss 110 is attached to the outer ring. Consequently, the encoder head faces the annular encoder track 823 and can read the indication of the annular encoder track. This makes it possible to use standard encoders which typically comprises an annular encoder track.

Figure 9:
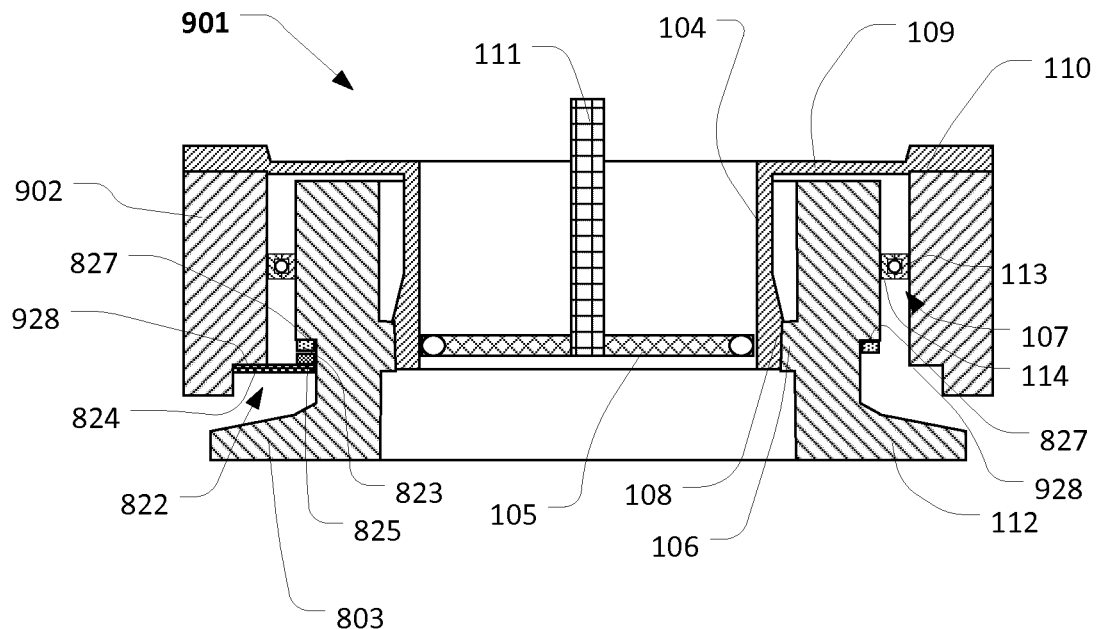

FIG. 9 illustrates a simplified cross-sectional view of another embodiment of a strain wave gear 901 according to the second aspect of the present invention. The strain wave gear 901 is like the strain wave gear 701 and 801 illustrated in FIGS. 7 and 8 and similar elements have been given the same reference numbers and will not be described further.

In this embodiment the encoder reader 822 is disposed on an inner annular flange 928 of the outer ring 902. The inner annular flange 928 of the outer ring comprises a surface facing away from the end where the annular boss 110 is attached to the outer ring 902; and the encoder PCB 824 is arranged at the surface of the inner annular flange 928 facing away from the end where the annular boss 110 is attached to the outer ring 802.

Figure 10:
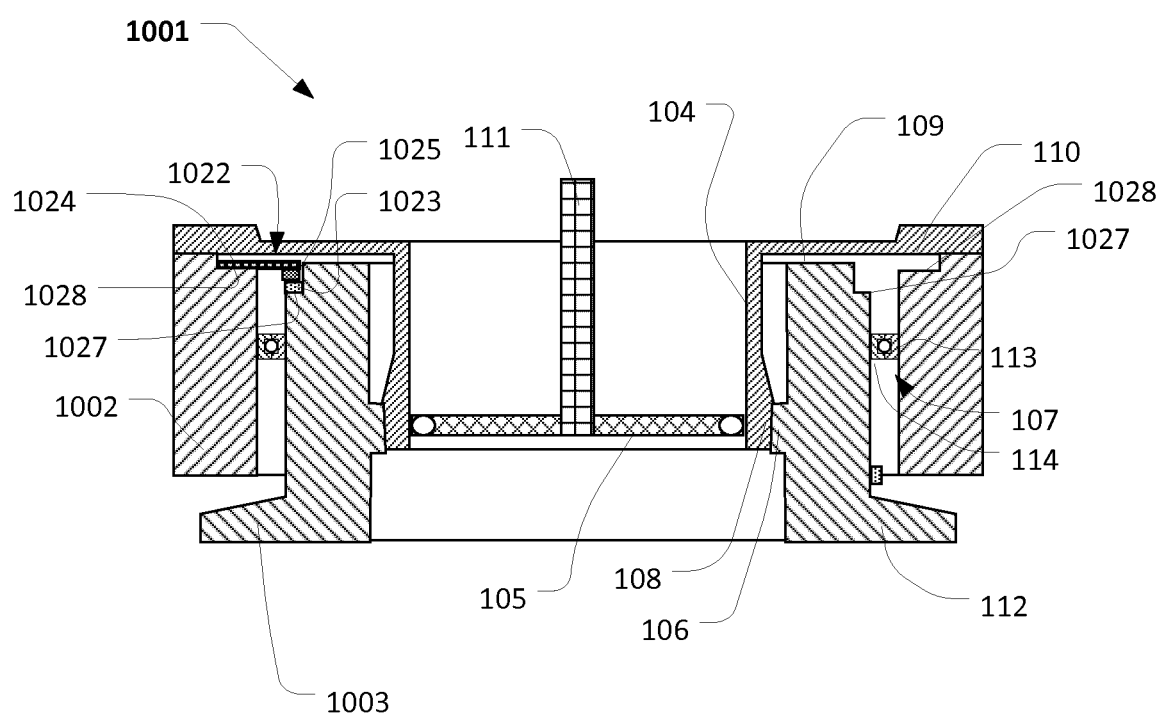

FIG. 10 illustrates a simplified cross-sectional view of another embodiment of a strain wave gear 1001 according to the second aspect of the present invention. The strain wave gear 1001 is like the strain wave gear 701 illustrated in FIG. 7 and similar elements have been given the same reference numbers as in FIG. 7 and will not be described further. The encoder reader 1022, the encoder PCB 1024, the encoder head 1025, the encoder track 1023 functions like the encoder reader 722, the encoder PCB 724, the encoder head 725, the encoder track 723 describe previously and their functionality will not be described further.

In this embodiment the encoder reader 1022 is disposed on an inner annular flange 1028 of the outer ring 1002. The inner annular flange 1028 of the outer ring comprises a surface facing towards the end where the annular boss 110 is attached to the outer ring 1002; and the encoder PCB 1024 is arranged at the surface of the inner annular flange 1028 facing towards the end where the annular boss 110 is attached to the outer ring 802. The encoder track 1025 is provided as an annulus and is arrange on an outer annular flange 1027 of the inner ring 1002. The outer annular flange 1027 of the inner ring comprises a surface facing towards the end of the strain wave gear where the annular boss 110 is attached to the outer ring 1002. The encoder head 1025 is arranged on the encoder PCB 1024 and faces the surface facing of the outer annular flange facing towards the end of the strain wave gear where the annular boss 110 is attached to the outer ring. It is noted that alternatively the annular encoder tracks 1023 can be arrange at the end surface of the inner ring that faces towards the end of the strain wave gear where the boss 110 is attached to the outer ring.

Figure 11A:
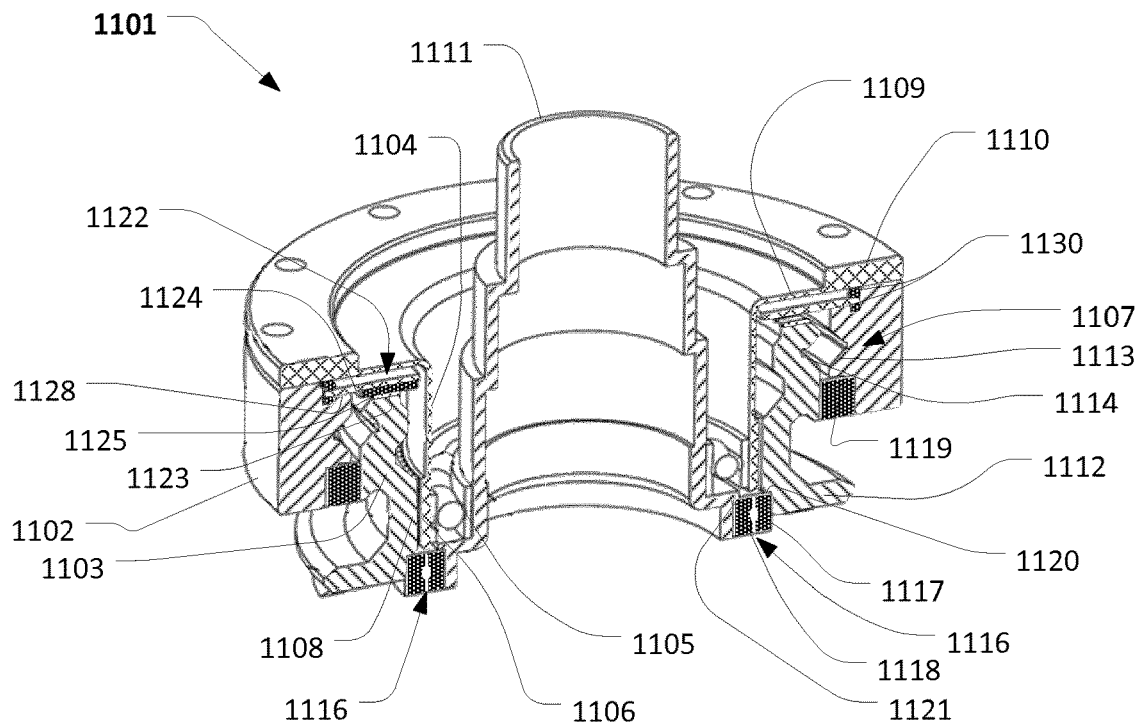
FIGS. 11A and 11B illustrate a strain wave gear according to the present invention.
Figure 11B:
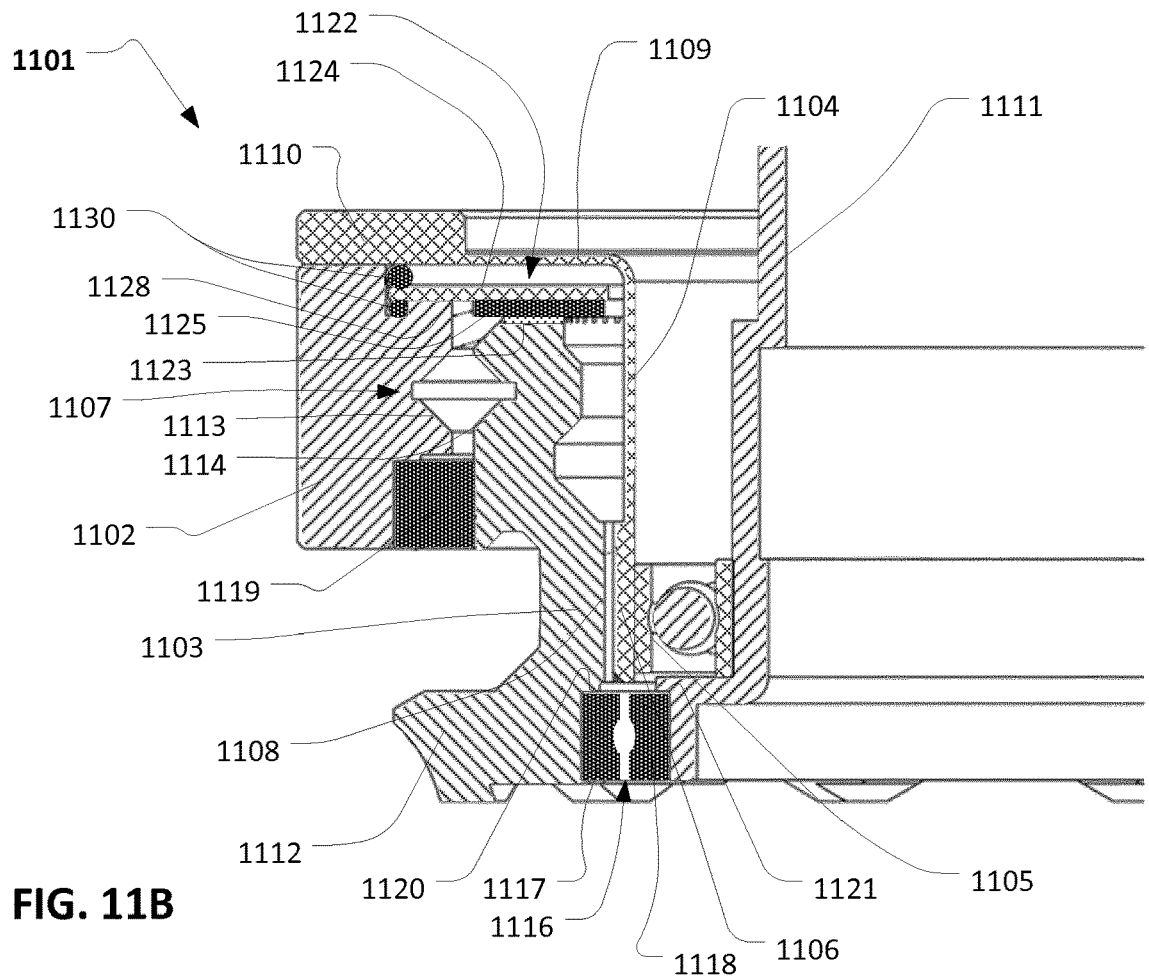

FIGS. 11A and 11B illustrate a strain wave gear 1101 according to the present invention, where FIG. 11A is a perspective view of the strain wave gear with one half of the strain wave gear cut away and FIG. 11B is a cross-sectional view of one half of the strain wave gear. The strain wave gear comprises an outer ring 1102, an inner ring 1103, a flex spline 1104 and a wave generator 1105.

As described previously the outer ring 1102 and outer ring 1103 are formed as an annular shaped body. The inner ring 1103 is rotatable arranged in the central opening of the outer ring 1102 and the flex spline 1104 is arranged in the central opening of the inner ring 1102. The inner ring 1103 comprises an internally toothed gear 1106 arrange at the inner wall of the inner ring and facing the central opening of the inner ring. The inner ring is rotatably arranged in the outer ring via an internal bearing 1107. The internal bearing 1107 is embodied as a cross roller bearing where the outer racer 1113 is integrally formed in the outer ring 1102 and the inner racer is integrally formed in the inner ring 1103. The flex spline 1104 is formed as a flexible cylindrical body, arranged in the inner ring and comprises an external toothed gear 1108. The external toothed gear is configured to at least partially intermesh with the internal toothed gear 1106. The flex spline comprises an annular diaphragm 1109 formed integrally with the cylindrical body and extending outwardly in relation to the cylindrical body. The annular diaphragm 1109 comprises and annular boss 1110 formed integrally on a circumferential outer peripheral edge of the diaphragm. The annular boss 1110 is fixed to the outer ring 1102 using any kind of fasteners such as screws, rivets, nails, click/snap mechanisms, adhesive, welding or any other kind of means for fastening the annular boss to the outer ring. Consequently, the inner ring is arranged between the outer ring 1102 and the cylindrical body of the flex spline 1104. The external gear teeth 1108 are formed at the other end of the cylindrical body and extend along the outer peripheral surface of the cylindrical body. The wave generator 1105 is rotatably arranged in the flex spline 1104 and rotatable by a hollow input shaft 1111. The input shaft is configured to rotate the wave generator in relation to the flex spline and the wave generator is upon rotation configured to flex the flexible cylindrical body in a radial direction to partly mesh the external toothed gear 1108 with the internally toothed gear 1106. In the illustrated embodiment the wave generator is provided as an elliptical wave generator as known in the art of strain wave gears. The number of teeth of the internal toothed gear and the external toothed gear are different and rotation of the wave generator moves meshing positions of the gears in a circumferential direction causing the inner ring to rotate in relation to the outer ring. The input shaft can for instance be driven by a motor whereby the strain wave gear forms a transmission system between the motor and output side of the strain wave gear.

A part of the inner ring extends out of said outer ring and comprises an outwardly protruding output flange 1112. The outwardly protruding output flange extends outwardly in relation to the inner ring and towards the outer ring. Providing the inner ring with an outwardly protruding output flange makes it possible to connect the strain wave gear directly to the object to be driven by the strain wave gear, whereby the previously described advantages and benefits can be achieved. In this embodiment the outwardly protruding output flange is provided as one of the component flanges of the releasable joint assembly disclosed by WO 2018/130447 incorporated herein by reference.

The input shaft 1111 extends through the flex spline 1104 and is rotatable supported by the inner ring 1103 via an input shaft support bearing 1116. The input shaft support bearing 1116 comprises an outer racer 1117 arranged in the inner ring 1103 and inner racer 1118 wherein the input shaft 111 is arranged. The inner ring 1103 comprise an inner annular flange 1120 configured to support the input shaft support bearing 1116, and the input shaft 1111 can comprise an outer annular flange 1121 configured to support the input shaft support bearing 1116. This ensures that the input shaft 1111 is arranged at the correct position inside the strain wave gear. A seal 1119 is arranged between the inner ring 1102 and the outer ring 1103 to prevent lubrication provided inside the internal bearing 1107 from leaking out. The sealing can be provided as any kind of sealing known from strain wave gears.

The strain wave gear 1101 comprises an encoder reader 1122 disposed on the outer ring 1102 and an encoder track 1123 disposed on the inner ring 1103, where the encode reader comprises an encoder PCB (printed circuit board) 1124 comprising electronics for controlling and reading signals to and from an encoder head 1125. By placing the encoder reader 1122 on the fixed part of the outer ring 1102 and placing the encoder track 1132 on the rotating inner ring 1103, there is no need for extra parts, and the tolerance chain between the encoder parts is the shortest possible. Especially magnetic encoders are relying on short reading distance to deliver high accuracy and precision, and this will be possible with this invention without the need for additional manual adjustment after assembly. In this embodiment electronic encoder parts (encoder reader 1122 and encoder track 1123) are arranged inside a strain wave gear which unusual because the encoder parts will be in a cavity normally filled with oil or grease. This is however not prohibitive when using a suitable oil or grease and protecting the electronics properly. Gaskets 1130 (1230 in FIGS. 12A, 12B) can be placed on each side of the encoder PCB 1124 and one or more wires can exit through a dedicated tunnel from the gear cavity to the outside. The wires are typical needed in order to receive encoder signals from the encoder reader. This saves weight and cost. The reading distance between the encoder head 1125) and the encoder track 1123 will be very precise without the need for manual adjustment. This is an advantage because of easier assembly and lower cost. The precision and accuracy of the encoder readout can be higher than in other designs because of the precisely controlled reading distance between encoder parts. This is a big advantage in many applications where precision and accuracy are needed. There is no need for mechanical transmission parts to drive the encoder track relatively to the output from the gear. This would result in lower precision and accuracy plus added cost and quality issues. The encoder parts are mechanically well protected by sitting inside the strain wave gear. This is an advantage in applications with harsh environments that could damage the delicate electronics. The encoder track 1123 can be of large diameter which raises precision and accuracy.

In one embodiment the Encoder PCB 1124 and electronics can be coated with a suitable coating to make sure it does not release any chemical agents to the grease/oil inside the gear. The encoder reading principle can be selected specially for use where grease/oil can be present e.g. magnetic vs optical. The reading track can be a physical pattern in the surface of the output bearing material (machined, etched, laser engraved etc.) to avoid extra parts inside the gear. The wire from the encoder PCB can be a flex wire exiting from the edge of the PCB, to make it easier to place gaskets around the PCB.

In this embodiment three parts of a typical strain wave gear are assembly into a single part. This means that the inner racer 1114 of the internal bearing 1107; the internal toothed gear 1108 (also called a circular spline) and the output flange part 1112 is fabricated as a single part. There are several distinct advantages of this: higher load capacity, lower weight, easier assembly, better quality, lower tolerances, less space requirements, less cost. This kind of integration is normally not thought of because the internal bearings are normally provided as a separate part from specialized suppliers. Also, the internal toothed gear (circular spline part) is highly specialized fabrication from few suppliers and it is considered necessary to add a separate output flange to interface the strain wave gear to the rest of the application.

The strain wave gear may also comprise first and second end plates (not shown). The first end plate may be arranged at the input side of the strain wave gear above the annular boss 1110 of the flex spline and comprise an opening allowing the input shaft 1111 to pass through the first end plate. The input shaft may be rotatably supported by the first and second end plates via bearings. The second end plate may be arranged at the output side of the strain wave gear at the end surfaces of the inner ring and comprises an opening allowing the input shaft and outwardly protruding output flange to pass through the second end plate.

Figure 12A:
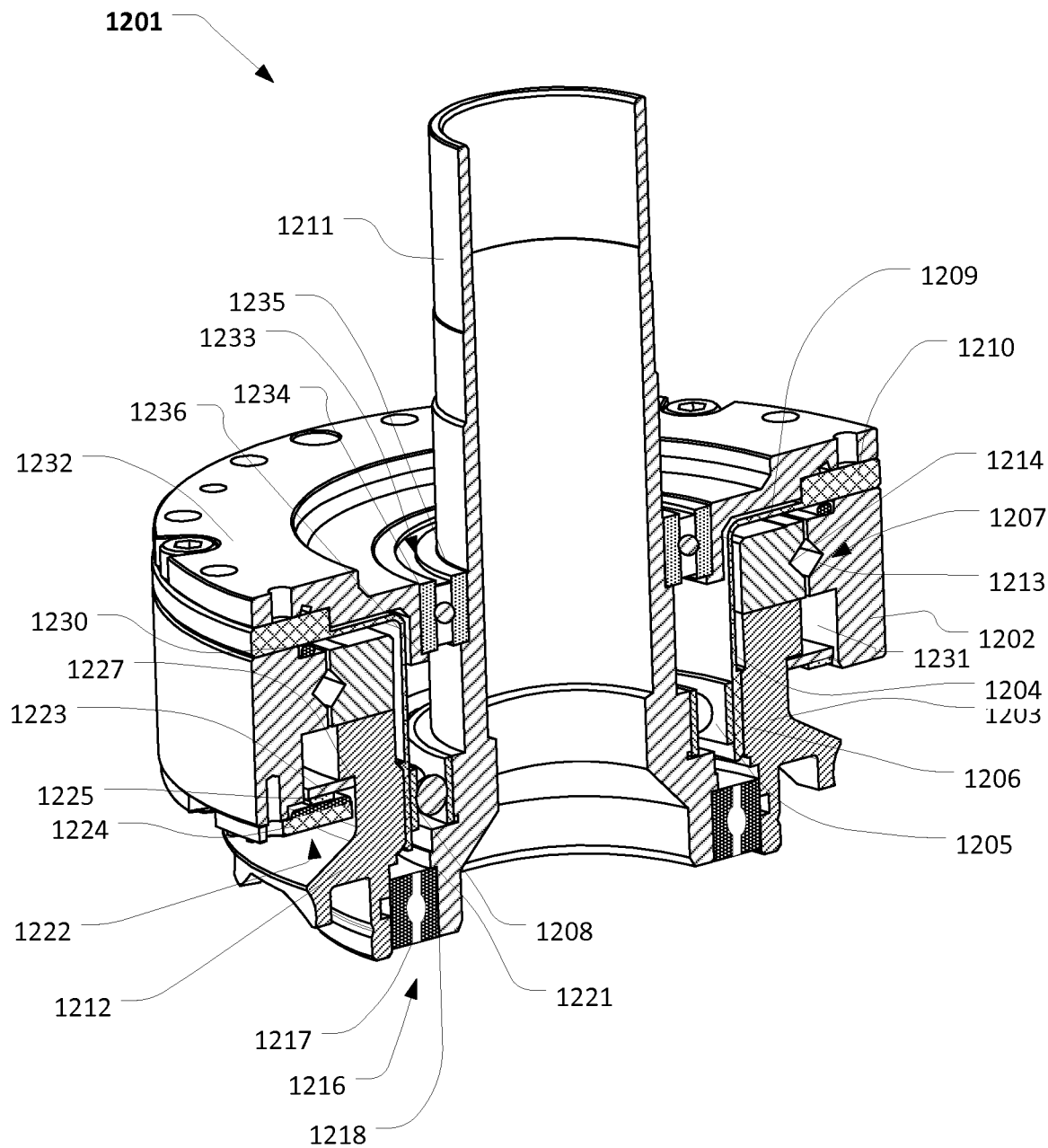
FIGS. 12A and 12B illustrate a strain wave gear according to the present invention.
Figure 12B:
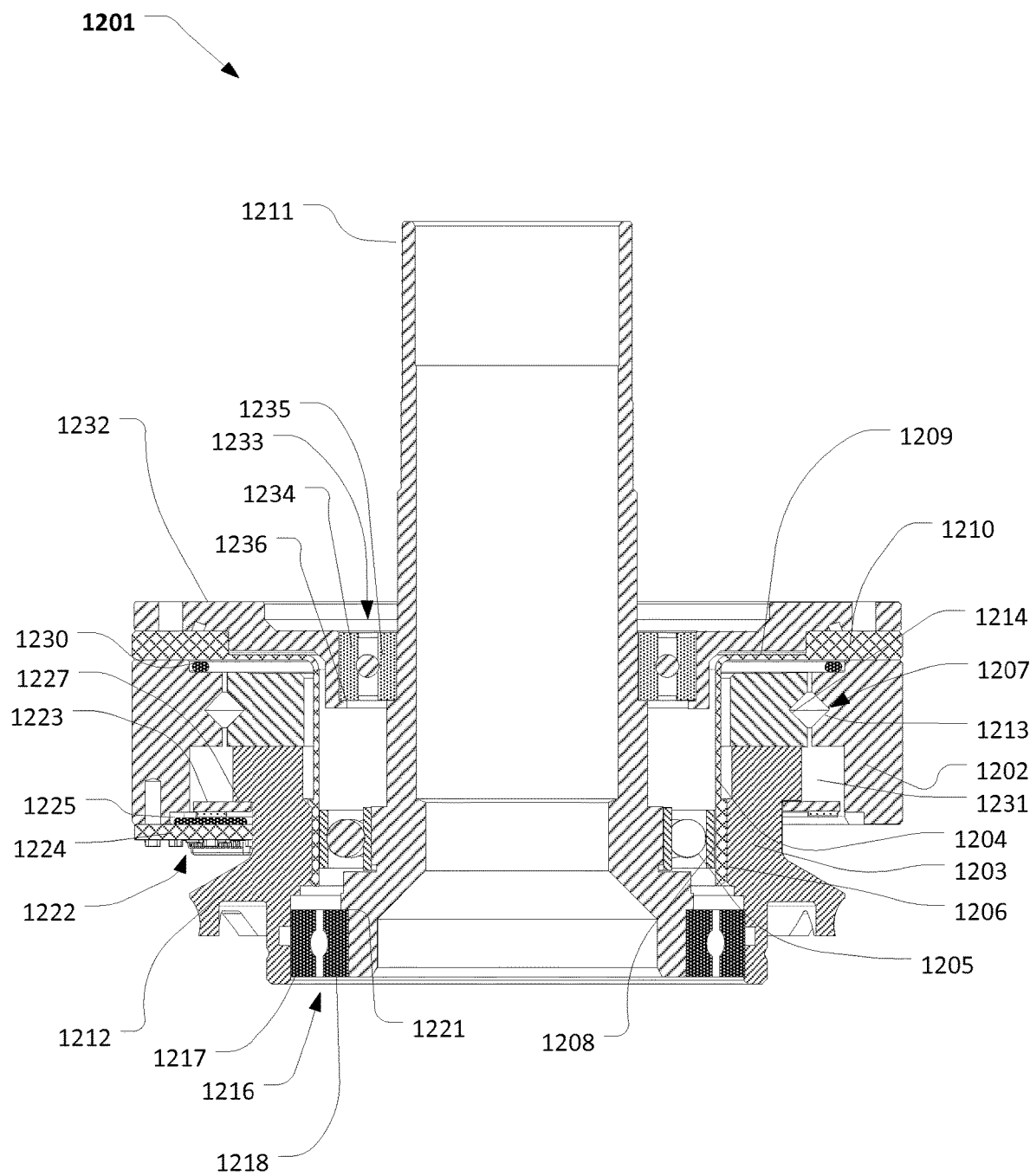

FIGS. 12A and 12B illustrate a strain wave gear 1201 according to the present invention, where FIG. 12A is a perspective view of the strain wave gear with one half of the strain wave gear cut away and FIG. 12B is a cross-sectional view of the strain wave gear. The strain wave gear comprises an outer ring 1202, an inner ring 1203, a flex spline 1204 and a wave generator 1205.

As describe previously the outer ring 1202 and outer ring 1203 are formed as annular shaped bodies. The inner ring 1203 is rotatable arranged in the central opening of the outer ring 1202 and the flex spline 1204 is arranged in the central opening of the inner ring 1202. The inner ring 1203 comprises an internally toothed gear 1206 arrange at the inner wall of the inner ring and facing the central opening of the inner ring. The inner ring is rotatably arranged in the outer ring via an internal bearing 1207.

The internal bearing 1207 is embodied as a cross roller bearing where the outer racer 1213 is integrally formed in the outer ring 1202. The inner racer 1214 of the cross roller bearing 1207 is provided as a separate part and one end of the inner ring 1203 is coaxially connected to the inner racer 2014. The inner ring 1203 and inner racer 1214 are thus consecutively arrange along the axis of rotation of the inner ring. The inner ring 1203 and the inner racer 1214 can be connected using any kind of fasteners such as screws, rivets, nails, click/snap mechanisms, adhesive, welding, press fit or any other kind of means for fixing the inner ring 1203 and the inner racer 1214 in relation to each other.

The flex spline 1204 is formed as a flexible cylindrical body, arranged in the inner ring and comprises an external toothed gear 1208. The external toothed gear is configured to at least partially intermesh with the internal toothed gear 1206. The flex spline comprises an annular diaphragm 1209 formed integrally with the cylindrical body and extending outwardly in relation to the cylindrical body. The annular diaphragm 1209 comprises and annular boss 1210 formed integrally on a circumferential outer peripheral edge of the diaphragm. The annular boss 1210 is fixed to the outer ring 1202 using any kind of fasteners such as screws, rivets, nails, click/snap mechanisms, adhesive, welding or any other kind of means for fastening the annular boss to the outer ring. Consequently, the inner ring is arranged between the outer ring 1202 and the cylindrical body of the flex spline 1204. The external gear teeth 1208 are formed at the other end of the cylindrical body and extend along the outer peripheral surface of the cylindrical body. The wave generator 1205 is rotatably arranged in the flex spline 1204 and rotatable by a hollow input shaft 1211. The input shaft is configured to rotate the wave generator in relation to the flex spline and the wave generator is upon rotation configured to flex the flexible cylindrical body in a radial direction to partly mesh the external toothed gear 1208 with the internally toothed gear 1206. In the illustrated embodiment the wave generator is provided as an elliptical wave generator as known in the art of strain wave gears. The number of teeth of the internal toothed gear and the external toothed gear are different and rotation of the wave generator moves meshing positions of the gears in a circumferential direction causing the inner ring to rotate in relation to the outer ring. The input shaft can for instance be driven by a motor whereby the strain wave gear forms a transmission system between the motor and output side of the strain wave gear.

A part of the inner ring extends out of said outer ring and comprises an outwardly protruding output flange 1212. The outwardly protruding output flange extends outwardly in relation to the inner ring and towards the outer ring. Providing the inner ring with an outwardly protruding output flange makes it possible to connect the strain wave gear directly to the object to be driven by the strain wave gear, whereby the previously described advantages and benefits can be achieved. In this embodiment the outwardly protruding output flange is provided as one of the component flanges of the releasable joint assembly disclosed by WO 2018/130447 incorporated herein by reference.

The input shaft 1211 extends through the flex spline 1204 and is rotatable supported by the inner ring 1203 via an input shaft support bearing 1216. The input shaft support bearing 1216 comprises an outer racer 1217 arranged in the inner ring 1203 and inner racer 1218 wherein the input shaft 1211 is arranged. The input shaft 1211 comprises an outer annular flange 1221 configured to support the input shaft support bearing 1216. A seal (not shown) can be arrange in a cavity 1231 between the inner ring 1202 and outer ring 1203. The seal can prevent lubrication provided inside the internal bearing 1207 from leaking out. The sealing can be provided as any kind of sealing known from strain wave gears.

The strain wave gear comprises a first end plate 1232 arranged at the input side of the strain wave gear above the annular boss 1210 of the flex spline and comprise an opening allowing the input shaft 1211 to pass through the first end plate. The input shaft 1211 is rotatably supported by the end plate via a support bearing 1233. The support bearing 1233 comprises an outer racer 1234 arranged in the first end plate 1232 and an inner racer 1235 wherein the input shaft 1211 is arranged. The outer racer 1234 is supported by an inner annular flange 1236 of the first end plate.

The strain wave gear 1201 comprises encoder reader 1222 disposed on the outer ring 1202 and an encoder track 1223 disposed on the inner ring 1203, where the encode reader comprises an encoder PCB (printed circuit board) 1224 comprising electronics for controlling and reading signals to and from and encoder head 1225. The encoder PCB 1224 is arranged at the end of the outer ring 1202 opposite the end where the annular boss 1210 is fixed to the outer ring 1202. The encoder track 1223 is provided as an annulus and is arrange on an outer annular flange 1227 of the inner ring 1202. The outer annular flange 1227 of the inner ring comprises a surface facing away from the end of the strain wave gear where the annular boss 1210 is attached to the outer ring 1202. The encoder head 1225 is arranged on the encoder PCB 1224 and faces the surface facing of the outer annular flange facing away from the end of the strain wave gear the annular boss 1210 is attached to the outer ring.

Figure 13:
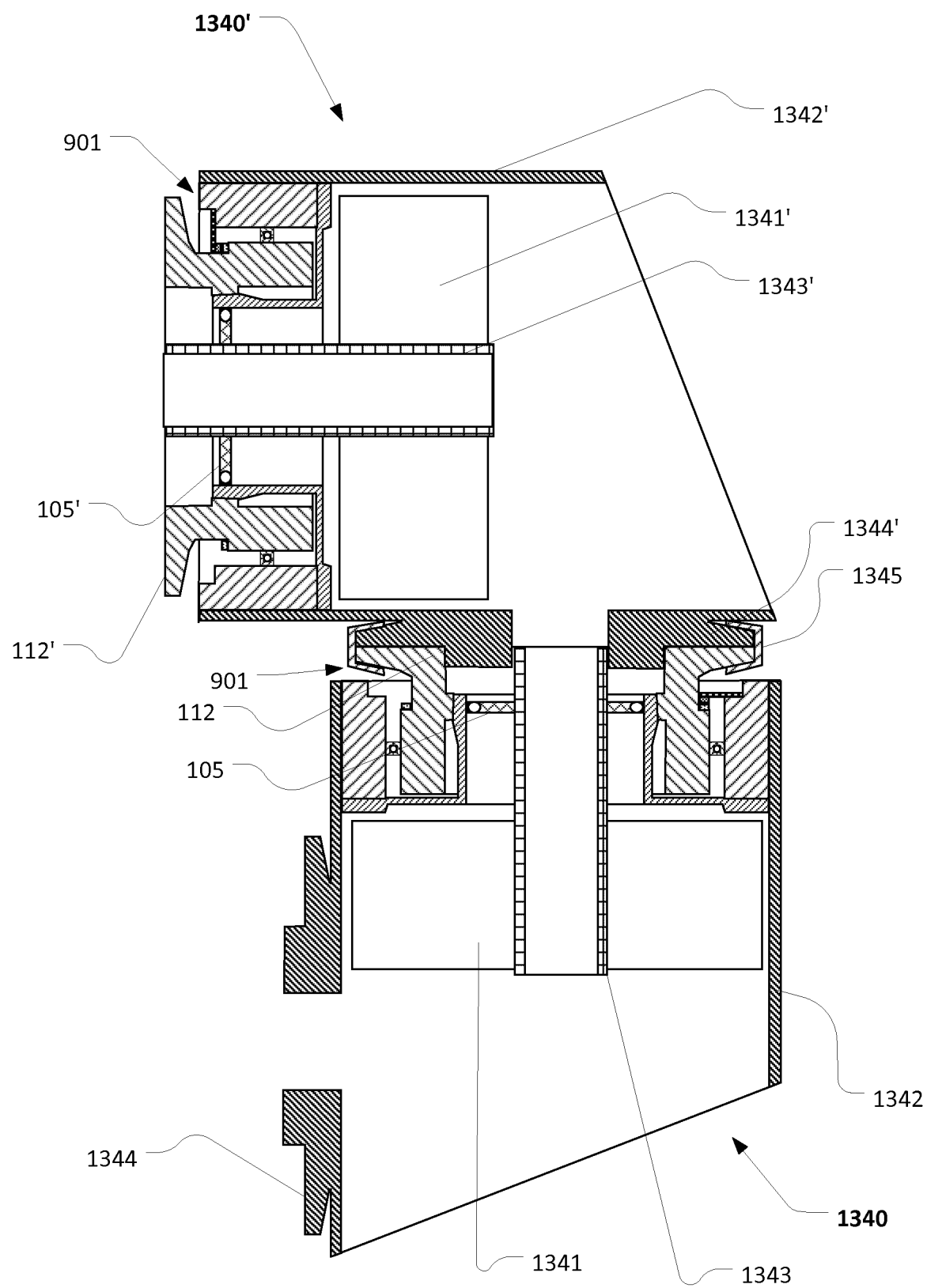
FIG. 13 illustrates a robot joint comprising a strain wave gear according to the present invention.

FIG. 13 illustrates a simplified cross-sectional view of a robot joint 1340 comprising a strain wave gear according to the present invention. The robot joint 1340 can form part of a robot arm comprising a plurality of robot joints and is connectable to at least another robot joint 1340 ' via an output flange 112. The other robot joint 1340 ' is illustrated identically to first robot joint 1340 and similar features have been given the same reference numbers with a prime sign after the reference number. In the illustrated embodiment the two robot joints are connected directly with each other, however it is to be understood that a robot link can be inserted between the robot joints. The robot joint comprises a joint motor 1341 arranged in a robot joint housing 1342. The joint motor comprises a motor axle 1343 rotatable around a motor axis and the motor axle is via a strain wave gear 901 configured to rotate the output flange 112 in relation to the robot housing 1342 by rotating a wave generator 105 of the strain wave gear. In the illustrated embodiment the strain wave gear is provided as the strain wave gear 901 illustrated in FIG. 9, however it is to be understood that any of the previously described strain wave gears or combinations thereof can be provided as the strain wave gear of the robot joint. For the sake of simplicity of the drawing the elements of the strain wave gear 901 has not been provided with all of the reference numbers illustrated in FIG. 9. The motor axle is provided as input shaft to the strain wave gear and rotates the wave generator 105 and is hollow to allow wires to be lead through the robot joints and robot arm.

The robot housing comprises an input flange 1344 configured to connect with the output flange of another robot joint or robot link. The output flange 112 of the robot joint is connected to the input flange 1344' of the other robot 1340'. The input flanges 1344, 1344' are formed as outwardly protruding input flanges and can be clamped to an output flange using an annular clamp 1345. Output flange 112 of robot joint 1340 is thus connected to input flange 1344' of robot joint 1340'. However, it is to be understood that other mechanism for connecting the output flange and input flanges of two robot joints, for instance click/snap mechanism, screws, threads etc. Providing the robot joint with the strain wave gear according to the present invention results in the advantages and benefits described previously and makes it possible to provide a more reliable and less expensive robot joint.

Figure 14A:
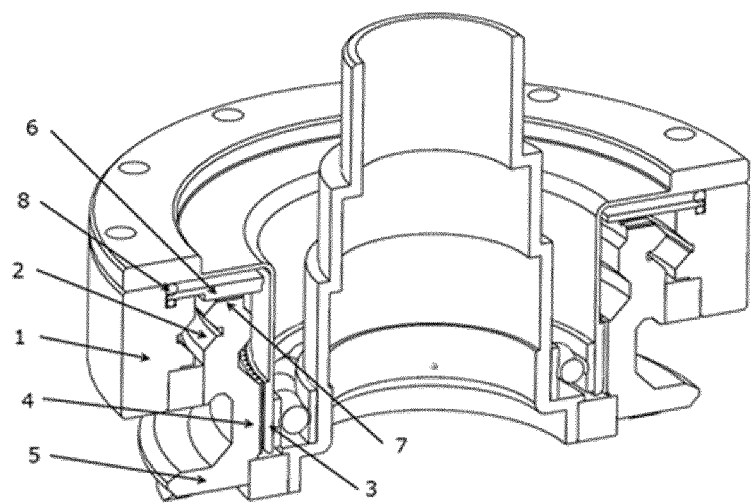
FIG. 14A and 14B illustrate an alternative example of a wave gear drive according to the present invention.
Figure 14B:
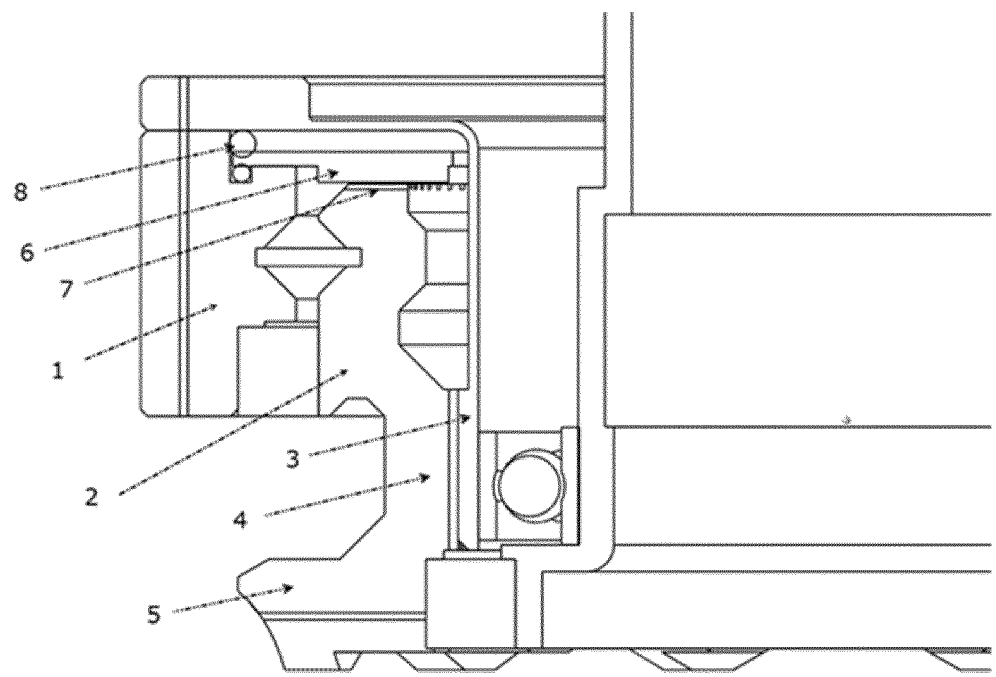

The following paragraphs [0054]-[0078] present an alternative disclosure of the present invention with reference to FIG. 14A and 14B. FIG. 14A illustrates a cross sectional view of an example of a wave gear drive according to the present invention and FIG. 14B illustrates a cross sectional view of a section the wave gear drive shown in FIG. 14A. It is noted that the systematic of the figure references deviates from the previous paragraphs and figures.

In order to solve the above and other objects, according to the present invention, there is in a first aspect provided a strain wave gear drive comprising:
- an outer ring (1) of output bearing in strain wave gear;
- inner ring (2) of output bearing in strain wave gear;
- an output flange (5);
- a flexible spline part (3) with an external gear positioned inside the internal gear; and
- a circular spline part (4) with an internal gear, and
- a wave generator disposed within said flexible spline part for deflecting the part (3) in radial direction for partially engaging the external gear with the internal gear;

wherein the inner ring (2) and the circular spline part (4) constitutes a single piece in combination with the output flange of strain wave gear (5) being coaxially disposed.

The outer ring (1) and/or the inner ring (2) is/are formed from a lightweight material. Also, the internal and external gears can be toothed gears. The flexible spline part (3) may have a cylindrical body portion, an annular diaphragm formed integrally with said body portion in a condition closing one end opening of said body portion, a boss integrally formed with said diaphragm and located at the center of the latter, and external gear teeth formed at the other end opening of said body portion and extending along the outer peripheral surface. A cross roller bearing may be disposed on the outer periphery of the cylindrical body portion of the flexible spline part (3), and the outer ring (1) fixed to one end plate via an annular boss and the inner ring (2) fixed to another end plate via the circular spline part (4).

As noted above the present invention is also directed to a solution embodying an encoder placed inside the strain wave gear. In that respect the following two exemplary alternative configurations apply:
i) the reading head (6) of the encoder is disposed on the outer ring (1) of the output bearing and the read track (7) is disposed on the inner ring (2) of output bearing; and
ii) the encoder is placed inside the strain wave gear so that the reading head (6) of the encoder is disposed on the inner ring (2) of the output bearing and the read track (7) is disposed on the outer ring (1) of output bearing.

In a second aspect the present invention provides a strain wave gear drive with an encoder inside, said drive comprising:
- outer ring (1) of output bearing in strain wave gear;
- inner ring (2) of output bearing in strain wave gear;
- a circular spline part (4) with internal gear and which is rotatable around a rotational axis;

a flexible spline part (3) with an external gear positioned inside the internal gear which is concentrically disposed within the circular spline part (4);

a wave generator disposed within said flexible spline part for deflecting the part (3) in radial direction for partially engaging the external gear with the internal gear;

a ball bearing flexible in the radial direction disposed between the wave generator and the flexible spline part (3), wherein an encoder is placed inside the strain wave gear so that the reading head (6) of the encoder is disposed on the outer ring (1) of the output bearing and the read track (7) is disposed on the inner ring (2) of output bearing.

In an alternative of the second aspect of the present invention there is provided a strain wave gear drive with a encoder inside, said drive comprising:

outer ring (1) of output bearing in strain wave gear;
inner ring (2) of output bearing in strain wave gear;
a circular spline part (4) with internal gear and which is rotatable around a rotational axis;
a flexible spline part (3) with an external gear positioned inside the internal gear which is concentrically disposed within the circular spline part (4);
a wave generator disposed within said flexible spline part for deflecting the part (3) in radial direction for partially engaging the external gear with the internal gear;
a ball bearing flexible in the radial direction disposed between the wave generator and the flexible spline part (3), wherein an encoder is placed inside the strain wave gear so that the reading head (6) of the encoder is disposed on the inner ring (2) of the output bearing and the read track (7) is disposed on the outer ring (1) of output bearing.

FIG. 14A and 14B show a cross section of a wave gear drive according to the present invention. The wave gear drive has first and second end plates and positioned in a prescribed gap along an axial direction thereof. A cross roller bearing (or a normal ball bearing) is positioned at a radially outer side between the first and second end plates. An input rotational shaft is arranged passing through the first and second end plates along the axial direction. The input rotational shaft is rotatably supported by these end plates via ball bearings and mounted on circumferential inner surfaces and of the end plates, respectively. The cross roller bearing has an inner race which in integrally formed with a rigid internal gear. More specifically, internal teeth of the rigid internal gear are formed on a circumferential inner surface of the inner race. Inside the internal teeth, there is provided a flexible external gear having external teeth. An elliptical wave generator may be inserted into the flexible external gear. The external gear has a cylindrical body, a circular diaphragm extending outward in a radial direction from one open end of the body, a circular boss formed integrally on a circumferential outer peripheral edge of the diaphragm. The external teeth are formed on a circumferential outer surface of the other open end portion of the body. The wave generator comprises an elliptical rigid cam plate and a wave bearing fixed on the cam plate.

The encoder parts (6 and 7) can be mounted directly on the output bearing parts without need for special platforms/brackets or other support parts.

This saves weight and cost. The reading distance between the encoder read head (6) and the encoder read track (7) will be very precise without the need for manual adjustment. This is an advantage because of easier assembly and lower cost. The precision and accuracy of the encoder readout can be higher than in other designs because of the precisely controlled reading distance between encoder parts. This is a big advantage in many applications where precision and accuracy is needed. There is no need for mechanical transmission parts to drive the encoder disc relatively to the output from the gear. This would result in lower precision and accuracy plus added cost and quality issues. The encoder parts are mechanically well protected by sitting inside the gear. This is an advantage in applications with harsh environments that could damage the delicate electronics. The encoder read track (7) can be of large diameter which raises precision and accuracy.

The Encoder PCB and electronics can be coated with a suitable coating to make sure it does not release any chemical agents to the grease/oil inside the gear. The encoder reading principle can be selected specially for use where grease/oil can be present e.g. magnetic vs optical. The reading track can be a physical pattern in the surface of the output bearing material (machined, etched, laser engraved etc.) to avoid extra parts inside the gear. The wire from the encoder PCB can be a flex wire exiting from the edge of the PCB, to make it easier to place gaskets around the PCB.

The gear will be able to drive higher loads on the output because the output is an integral part of the output bearing and circular spline. This is an advantage for most applications. The output flange geometry will be very precisely centered with respect to the gear axis because there are no assembly tolerances from separate parts being screwed together. The gear will be easier and quicker to assemble because no screws are needed to assemble the separate parts. The quality and reliability of the gears will be higher because there is no risk of screws breaking or becoming loose and there is no risk of flanges slipping if screws are not tightened correctly. The weight of the gear will be lower because the integration of parts can be optimized for strength, where the separate parts need excessive material to form support geometry and centering rims, and because no screws are needed. The cost of the gear will be lower because of fewer parts to be fabricated and less material use.

The strain wave gear drive illustrated in FIGS. 14A and 14B can also be defined by the following statements in roman numbers:

Statement I: A strain wave gear drive comprising:
outer ring (1) of output bearing in strain wave gear;
inner ring (2) of output bearing in strain wave gear;
an output flange (5);
a flexible spline part (3), such as a cup type flex spline or silk hat flex spline, with an external gear positioned inside the internal gear; and
a circular spline part (4) with an internal gear,
wherein the inner ring (2) and the circular spline part (4) constitutes a single piece in combination with the output flange (5) being coaxially disposed.

Statement II: Strain wave gear of statement I, wherein a wave generator is disposed within said flexible spline part for deflecting the part (3) in radial direction for partially engaging the external gear with the internal gear Statement III: Strain wave gear of statement I or II, wherein flexible spline part (3) has a cylindrical body portion, an annular diaphragm formed integrally with said body portion in a condition closing one end opening of said body portion, a boss integrally formed with said diaphragm and located at the center of the latter, and external gear teeth formed at the other end opening of said body portion and extending along the outer peripheral surface.

Statement IV: Strain wave gear of statement III, wherein a cross roller bearing is disposed on the outer periphery of the cylindrical body portion of the flexible spline part (3), and the outer ring (1) fixed to one end plate via an annular boss and the inner ring (2) fixed to another end plate via the circular spline part (4).

Statement V: Strain wave gear of any one of the statements I to IV, wherein an encoder is placed inside the strain wave gear so that the reading head (6) of the encoder is disposed on the outer ring (1) of the output bearing and the read track (7) is disposed on the inner ring (2) of output bearing.

Statement VI: Strain wave gear of any one of the statements Ito IV, wherein an encoder is placed inside the strain wave gear so that the reading head (6) of the encoder is disposed on the inner ring (2) of the output bearing and the read track (7) is disposed on the outer ring (1) of output bearing.

Statement VII: A strain wave gear drive with an encoder inside, said drive comprising:
outer ring (1) of output bearing in strain wave gear;
inner ring (2) of output bearing in strain wave gear;
a circular spline part (4) with internal gear and which is rotatable around a rotational axis;
a flexible spline part (3) with an external gear positioned inside the internal gear which is concentrically disposed within the circular spline part (4);
a ball bearing flexible in the radial direction disposed between the wave generator and the flexible spline part (3),
wherein an encoder is placed inside the strain wave gear so that the reading head (6) of the encoder is disposed on the outer ring (1) of the output bearing and the read track (7) is disposed on the inner ring (2) of output bearing.

Statement VIII: Strain wave gear drive of statement VII, wherein a wave generator disposed within said flexible spline part for deflecting the part (3) in radial direction for partially engaging the external gear with the internal gear.

Statement IX: Strain wave gear of statement VII or VIII, wherein the inner ring (2) and the circular spline part (4) constitutes a single piece being coaxially disposed.

Statement X Strain wave gear of statement VII or VIII further comprising an output flange (5), wherein the inner ring (2) and the circular spline part (4) constitutes a single piece in combination with the output flange (5) being coaxially disposed.

Statement XI A strain wave gear drive with an encoder inside, said drive comprising:
outer ring (1) of output bearing in strain wave gear;
inner ring (2) of output bearing in strain wave gear;
a circular spline part (4) with internal gear and which is rotatable around a rotational axis;
a flexible spline part (3) with an external gear positioned inside the internal gear which is concentrically disposed within the circular spline part (4);
a ball bearing flexible in the radial direction disposed between the wave generator and the flexible spline part (3),
wherein an encoder is placed inside the strain wave gear so that the reading head (6) of the encoder is disposed on the inner ring (2) of the output bearing and the read track (7) is disposed on the outer ring (1) of output bearing.

Statement XII: Strain wave gear drive of statement XI, wherein a wave generator disposed within said flexible spline part for deflecting the part (3) in radial direction for partially engaging the external gear with the internal gear.

Statement XIII: Strain wave gear of statement XI or XII, wherein the inner ring (2) and the circular spline part (4) constitutes a single piece being coaxially disposed.

Statement XIV: Strain wave gear of statement XI or XII further comprising an output flange (5), wherein the inner ring (2) and the circular spline part (4) constitutes a single piece in combination with the output flange (5) being coaxially disposed.

Statement XV: A strain wave gear drive comprising:
outer ring (1) of output bearing in strain wave gear;
inner ring (2) of output bearing in strain wave gear;
an output flange (5) with an internal gear;
a flexible spline part (3), such as a cup type flex spline or silk hat flex spline, with an external gear positioned inside the internal gear; and
a circular spline part (4),
wherein the inner ring (2) and the circular spline part (4) constitutes a single piece in combination with the output flange (5) being coaxially disposed.

BRIEF DESCRIPTION OF FIGUR REFERENCES

FIGS. 1-13:

| | |
|---|---|
| 101, 201, 301, 401, 501, 601, 701, 801, 901, 1001, 1101, 1201, 901' | strain wave gear |
| 102, 202, 902, 1002, 1102, 1201 | outer ring |
| 103, 303, 403, 603, 1003, 1103, 1203 | inner ring |
| 104, 1104, 1204 | flex spline |
| 105, 1105, 1205, 105' | wave generator |
| 106, 1106, 1206 | internal toothed gear |
| 107, 207, 307, 407, 1107, 1207 | internal bearing |
| 108, 1108, 1208 | external toothed gear |
| 109, 1109, 1209 | annular diaphragm |
| 110, 1110, 1210 | annular boss |
| 111, 511, 611, 1111, 1211 | input shaft |
| 112, 1112, 1212, 112' | outwardly protruding output flange |
| 113, 213, 1113, 1213 | outer racer of internal bearing |
| 114, 214, 314, 414, 1114, 1214 | inner racer internal bearing |
| 516, 1116, 1216 | input shaft support bearing |
| 517, 1117, 1217 | outer racer of input shaft support bearing |
| 518, 1118, 1218 | inner racer of input shaft support bearing |
| 1119 | seal |
| 620, 1120 | inner annular flange of inner ring |
| 1121, 1221 | outer annular flange of input shaft |
| 722, 822, 1022, 1122, 1222 | encoder reader |
| 723, 823, 1023, 1123, 1223 | encoder track |
| 724, 824, 1024, 1124, 1224 | encoder reader PCB |
| 725, 825, 1025, 1125, 1225 | encoder reader head |
| 827, 1027, 1227 | outer annular flange of inner ring |
| 928, 1028, 1128, 1228 | inner annular flange of outer ring |
| 1130, 1230 | gaskets |
| 1231 | cavity |
| 1232 | first end plate |
| 1233 | input shaft support bearing |
| 1234 | outer racer of support bearing |
| 1235 | inner racer of support bearing |
| 1236 | inner annular flange of end plate |
| 1340, 1340' | robot joint |
| 1341, 1341' | joint motor |
| 1342, 1342' | joint housing |
| 1343, 1343' | joint motor |
| 1344, 1344' | input flange |

FIG. 14A and 14B
the outer ring of output bearing in strain wave gear (1),
the inner ring of output bearing in strain wave gear (2),
the flex spline part of strain wave gear (3),
the circular spline part of strain wave gear (4),
the output flange of strain wave gear (5),
the encoder read head (6),
the read track for encoder (7), and
the gasket for encoder PCB (8).

The invention claimed is:

1. A strain wave gear comprising:
an outer ring;
an inner ring within the outer ring and rotatable within the outer ring, the inner ring comprising an internally toothed gear;
a flex spline within the inner ring, the flex spline comprising a flexible part comprising an externally toothed gear;
a wave generator within the flex spline, the wave generator being rotatable relative to the flex spline and being configured to flex the flexible part in a radial direction to partly mesh the externally toothed gear with the internally toothed gear;
wherein the wave generator is configured to rotate to move meshing positions of the internally toothed gear and the externally toothed gear to cause the inner ring to rotate relative to the outer ring;
wherein the inner ring comprises an outwardly protruding flange that extends beyond the outer ring, the outwardly protruding flange extending outside an end portion of the outer ring and above the end portion of the outer ring;
wherein the outwardly protruding flange configured to enable direct connection to an object to be driven by the strain wave gear, the outwardly protruding flange and the inner ring being a single body, and the outwardly protruding flange comprising one or more mechanical elements configured to connect to the object; and
wherein the outer ring and the outwardly protruding flange are configured so that a gap between the outer ring and the outwardly protruding flange along an axial dimension of the strain wave gear is larger towards an exterior of the strain wave gear than towards an interior of the strain wave gear.

2. The strain wave gear of claim 1, further comprising at least one internal bearing at least partly between the inner ring and the outer ring.

3. The strain wave gear of claim 2, wherein the at least one internal bearing comprises an outer racer in the outer ring.

4. The strain wave gear of claim 3, wherein at least a part of the outer racer is integrally formed in the outer ring.

5. The strain wave gear of claim 2, wherein the at least one internal bearing comprises an inner racer, the inner ring having an end that is connected to the inner racer.

6. The strain wave gear of claim 5, wherein at least a part of the inner ring is in the inner racer.

7. The strain wave gear of claim 4, wherein at least a part of the inner racer is integrally formed in the inner ring.

8. The strain wave gear according to claim 7, wherein the inner racer, the internally toothed gear, and the output flange comprise a single part.

9. The strain wave gear of claim 1, wherein at least the internally toothed gear and the outwardly protruding flange comprise a single part.

10. The strain wave gear of claim 1, further comprising an input shaft configured to rotate the wave generator inside the flex spline, the input shaft being supported by the inner ring via at least one support bearing.

11. The strain wave gear of claim 10, wherein the inner ring comprises an inner annular flange configured to support the at least one support bearing.

12. The strain wave gear of claim 10, wherein the input shaft comprises an outer annular flange configured to support the at least one support bearing.

13. A robot joint for a robot arm, the robot joint comprising:
an output flange to connect the robot joint to at least another robot joint;
a housing;
a joint motor in the housing, the joint motor comprising a motor axle that is rotatable around a motor axis; and
the strain wave gear of claim 1;
wherein the motor axle is configured to rotate the output flange relative to the housing using the strain wave gear, the motor axle also being configured to rotate the wave generator.

14. The robot joint of claim 13, wherein the housing comprises an input flange configured for connection to an output flange of the at least another robot joint.

15. The strain wave gear of claim 1, further comprising:
a second outwardly protruding flange on the inner ring having a face that does not face the outer ring;
an encoder track on a surface of the second outwardly protruding output flange of the inner ring; and
an encoder reader on the outer ring, the encoder reader comprising electronics for reading the encoder track to obtain a position of the inner ring relative to the outer ring.

16. A strain wave gear system comprising:
an outer ring;
an inner ring within the outer ring and rotatable within the outer ring, the inner ring comprising an internally toothed gear, the inner ring comprising an outer flange having a surface that does not face the outer ring;
a flex spline within the inner ring, the flex spline comprising:
a cylindrical part comprising an externally toothed gear, and
an annular diaphragm formed integrally with the cylindrical part and extending outwardly in relation to the cylindrical part, the annular diaphragm comprising an annular boss formed integrally on a circumferential outer peripheral edge of the annular diaphragm, the annular boss being attached to the outer ring;
a wave generator within the flex spline, the wave generator being rotatable relative to the flex spline and being configured to flex the cylindrical part in a radial direction to partly mesh the externally toothed gear with the internally toothed gear;
wherein the wave generator is configured to rotate to move meshing positions of the internally toothed gear and the externally toothed gear to cause the inner ring to rotate relative to the outer ring;
an encoder reader comprising an encoder PCB (printed circuit board) comprising electronics for reading signals from an encoder track, wherein the encoder PCB is adjacent to the encoder track; and
the encoder track comprising an annulus and being on the surface of the outer flange of the inner ring, wherein the encoder PCB is at a part of the outer ring opposite to an end of the outer ring where the annular boss is attached to the outer ring.

17. The strain wave gear system of claim 16, wherein the outer flange is configured to support the encoder track.

18. The strain wave gear system of claim 16, wherein the outer ring comprises at least one inner annular flange configured to support the encoder reader.

19. The strain wave gear system according to claim 16, wherein the encoder reader and the encoder track are inside the strain wave gear system.

20. The strain wave gear system according to claim 16, wherein a part of the inner ring extends beyond the outer ring and comprises an outwardly protruding output flange.

21. A robot joint for a robot arm, the robot joint comprising:
- an output flange that is connectable to at least another robot joint; a housing;
- a joint motor in the housing, the joint motor comprising a motor axle that is rotatable around a motor axis; and
- the strain wave gear of claim 16;
- wherein the motor axle is configured to rotate the output flange relative to the housing; and
- wherein the motor axle is configured to rotate the wave generator.

22. The robot joint of claim 21 wherein the housing comprises an input flange configured for connection to a second output flange of the at least another robot joint.

* * * * *